Figure 1:
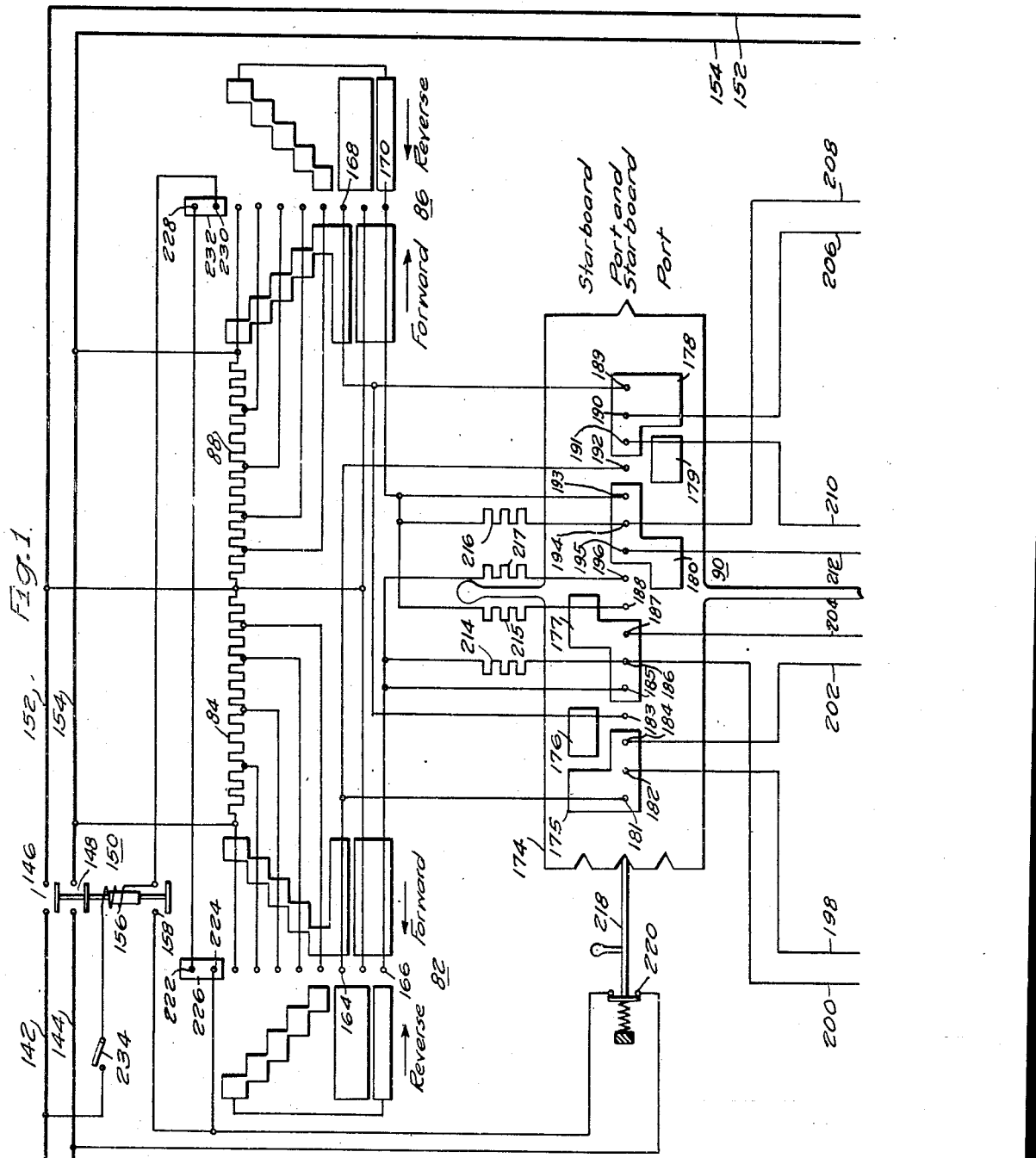

June 20, 1939.  H. C. COLEMAN ET AL  2,163,140

PARALLEL OPERATION OF MARINE GENERATORS

Filed Jan. 29, 1938  3 Sheets-Sheet 3

Fig. 3.

WITNESSES:
E. A. McCloskey.
Leon J. Taza.

INVENTORS
Harry C. Coleman
and Clarence Lynn.
BY
Paul E. Friedemann
ATTORNEY

Patented June 20, 1939

2,163,140

UNITED STATES PATENT OFFICE 2,163,140

PARALLEL OPERATION OF MARINE GENERATORS

Harry C. Coleman and Clarence Lynn, Forest Hills, Pa., assignors to Westinghouse Electric & Manufacturing Company, East Pittsburgh, Pa., a corporation of Pennsylvania Application January 29, 1938, Serial No. 187,696

14 Claims. (Cl. 172—8)

Our invention relates to electrical control systems and it has particular relation to the operation of control systems that are employed in connection with the propulsion of ships.

It is an object of our invention to provide apparatus for controlling a plurality of groups of parallelly connected generators supplying a plurality of motors so that the operation of the system will not be interrupted when one or more of the generators or one or several of the prime movers for the respective generators fail.

Another object of our invention is to provide apparatus for selectively connecting a plurality of parallelly connected generators in circuit relation with a motor or to connect one generator in circuit relation with each of a plurality of motors.

A further object of our invention is to provide apparatus for interconnecting certain of the series windings of a plurality of generators when they are operated in parallel and for disconnecting these series windings when the generators are operated individually.

A still further object of our invention is to provide means for selectively connecting certain of the field windings of the generators of a variable voltage system so that the speed of each motor may be individually controlled.

More specifically stated, it is an object of our invention to provide apparatus for selectively connecting a plurality of parallelly connected generators of a variable voltage system in circuit relation with a motor or to connect each generator in circuit relation with one of a plurality of motors and for selectively connecting certain of the field windings of the generators so that the speed of each motor may be individually controlled at all times.

According to our invention, we provide a plurality of groups of dynamo-electric machines, each group comprising a plurality of generators that may be connected to supply variable voltage power to at least one motor. When it is necessary to disconnect certain of the generators the remaining generators may be connected to supply power to one or all of the motors. A device such as a selector switch is utilized to selectively interconnect the motors and generators so that each motor is controlled individually from a certain controller. Also when a plurality of generators supply power to one motor they are connected in parallel circuit relation and certain of the regulating series windings on the generators are interconnected so that the load currents of the generators are effective to maintain a predetermined load division between the generators. But when a single generator supplies power to one motor, certain of the regulating series windings are disconnected. Auxiliary apparatus is also provided to prevent the opening of the main circuits of the generators when certain of the field windings are energized. Our invention has special utility in a system for controlling twin screw driven ships, but is not limited to this particular application.

Figure 2:
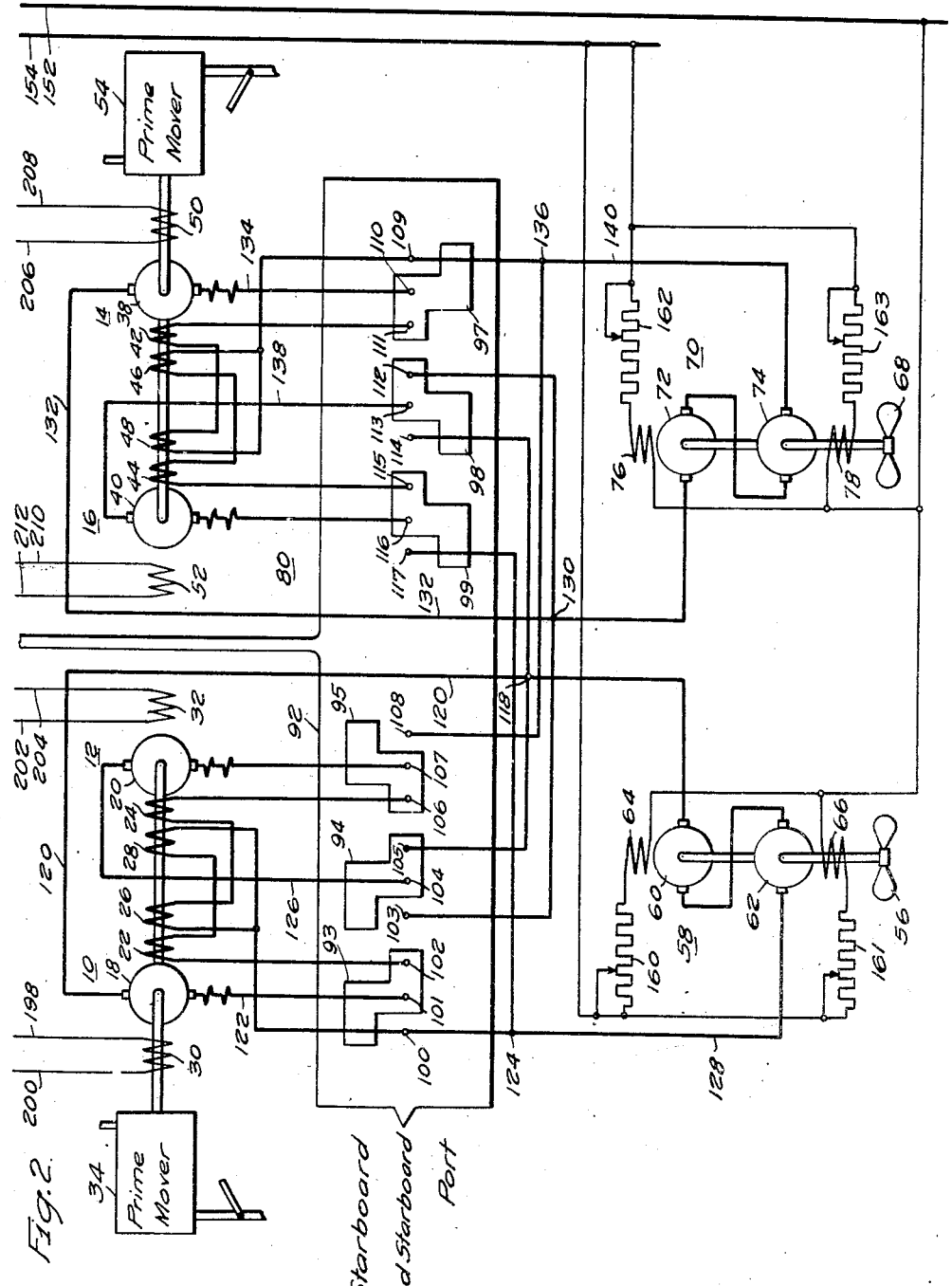

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings, in which:

Figures 1 and 2 collectively constitute a diagrammatic representation of a control circuit and apparatus embodying our invention as applied to a ship propulsion system; and Fig. 3 is a diagrammatic view illustrating a modification of our invention.

The apparatus shown in Figs. 1 and 2 comprises a plurality of direct current generators 10, 12, 14 and 16. Generators 10 and 12 having armatures 18 and 20, differential series field windings 22 and 24, cumulative series field windings 26 and 28 and separately excited main field windings 30 and 32, respectively, are mechanically coupled together and driven by a prime mover 34 such as a turbine or an internal combustion engine. Similarly, generators 14 and 16 having armatures 38 and 40, differential series field windings 42 and 44, cumulative series field windings 46 and 48 and separately excited main field windings 50 and 52, respectively, are mechanically coupled together and driven by a prime mover 54. A propeller 56 is driven by a double-armature motor 58 having armatures 60 and 62 and separately excited field windings 64 and 66. The armatures 60 and 62 are preferably connected in series but they may be connected in parallel. It will also be understood that a single armature motor may be used in place of the double armature motor. Similarly, a propeller 68 is driven by a double armature motor 70 having armatures 72 and 74 and separately excited field windings 76 and 78. A motor-generator selector switch 80 is utilized to electrically interconnect the armatures of the motors and generators. A speed controller 82 associated with a generator field potentiometer 84 is utilized to control the speed and the direction of rotation of the motor 58. Similarly, a speed controller 86 associated with the generator field potentiometer 88 is utilized to control the speed and the direction of rotation of the motor 70. A field selector switch 90 is disposed to be operated simultaneously with the motor generator selector switch 80, to electrically interconnect the separately excited generator field windings 30, 32, 50 and 52 with the speed controllers 82 and 86.

In the interest of clarity, the generators 10 and 12, the motor 58 and the speed controller 82 will, hereinafter, be referred to as the port generators, port motor and port speed controller respectively, and the generators 14 and 16, the motor 70 and the speed controller 86 will, hereinafter, be referred to as the starboard generators, the starboard motor and the starboard speed controller, respectively.

The motor-generator selector switch 80 comprises a slidably mounted base 92 upon which are properly arranged a plurality of contact segments 93, 94, 95, 97, 98 and 99, which contact segments are disposed to cooperate with a plurality of stationary contact fingers 100 to 117, inclusive. As will become apparent, a number of different operating conditions may be satisfied by the operation of selector-switch 80. For example, when operating conditions call for a maximum speed, which represents in the case of a screw propeller, the maximum load condition, the port motor and the starboard motor are individually and directly connected to the port generators and the starboard generators, respectively. Furthermore, the port generators are connected in parallel, and, similarly, the starboard generators are connected in parallel. In order to effect this circuit arrangement, the motor-generator selector switch 80 is actuated to the central position as shown in the drawings, and which will hereinafter be designated as the Port and Starboard position. The contact segments 93, 94 and 95 bridge the stationary contacts 101 and 102, 104 and 105 and 106 and 107, respectively, thus connecting the port generators 10 and 12 in parallel with each other and to the port motor 58. These circuits may be traced from one terminal of motor armature 60 to junction 118 where the circuit divides, one branch extends through the conductor 120, armature 18 of generator 10, conductor 122, stationary contacts 101 and 102 bridged by contact segment 93, differential field winding 22 of generator 10, cumulative field winding 28 of generator 20 to a junction 124. Another branch of the circuit extends from junction 118 through stationary contacts 105 and 104 and bridged by contact segment 94, conductor 126, armature 20 of generator 12, stationary contacts 107 and 106, bridged by contact segment 95, differential field winding 24 of generator 20, cumulative field winding 26 of generator 10, stationary contact 100 to junction 124. From junction 124, the circuit continues through conductor 128, motor armature 62 to the terminal of motor armature 60.

Similarly, the contact segments 97, 98 and 99 bridge the stationary contacts 110 and 111, 112 and 113, and 115 and 116, respectively, thus connecting the starboard generators 14 and 16 in parallel with each other and to the starboard motor 70. These circuits may be traced from one terminal of motor armature 72 to junction 130 where the circuit divides, one branch extends through the conductor 132, armature 38 of generator 14, conductor 134, stationary contacts 110 and 111, bridged by contact segment 97, differential field winding 42 of generator 14, cumulative field winding 48 of generator 16 to a junction 136.

The other branch of the circuit extends from junction 130 through stationary contacts 112 and 113 bridged by contact segment 98, conductor 138, armature 40 of generator 16, stationary contacts 116 and 115 bridged by contact segment 99, differential field winding 44 of generator 16, cumulative field winding 46 of generator 14, stationary contact 109 to junction 136. From the junction 136 the circuit continues through conductor 140, motor armature 74 to the other terminal of the motor armature 72.

The cumulative and differential windings on each of the parallel-connected generators have substantially equal but opposing field strengths when the load current is properly divided. Should generator 10 for example, tend to take more than its proportionate share of the load, the field excitation of the generator 12 is immediately increased through the action of the cumulative series field winding 28 thereby causing an increase in the voltage developed by generator 12. Simultaneously, therewith, the total excitation of the generator 10 is decreased in the same proportion through the action of the differential series field winding 22 thereby causing a decrease in the voltage developed by the generator 10. The simultaneous and opposite effect in the generators 12 and 10 causes the generators to assume their respective proportionate share of the load. While it is preferred that the generators have nearly shunt characteristics, the necessary drooping characteristic may be obtained by over or under compounding if desired by providing the required relative proportion of ampere turns to the series field windings.

It may become desirable or even necessary to operate both port and starboard motors from either the port generators or the starboard generators. For example, if the load is to be operated for a considerable period at reduced speed, the efficiency of the system may be increased by supplying power to the motors from either the port or the starboard generators only. Also, one of the generators or a prime mover may fail. For example, if a port generator fails, both port generators are disconnected from the port motor, and then both motors are connected to the starboard generators. When the generators are disconnected, the corresponding prime movers may be shut down and the necessary inspections and repairs can be made without totally interrupting the operation of the system.

To connect both motors in circuit relation with the starboard generators, the base of the motor-generator selector switch 80 is actuated to the Starboard position. In this position, the contact segments 93, 94 and 95 no longer engage any of the stationary contacts 100 to 108, inclusive, with the result that the port generators 10 and 12 are disconnected from the port motor 58. Also, the contact segment 97, 98 and 99 no longer bridge the stationary contacts 110 and 111, 112 and 113, and 115 and 116, respectively, but they do bridge stationary contacts 109 and 110, 113 and 114, and 116 and 117, respectively, with the result that the starboard generators 14 and 16 are no longer connected in parallel, but the starboard generator 14 is connected to the starboard motor 70 and the starboard generator 16 is connected to the port motor 58; also, the differential field windings 42 and 44 and the cumulative field windings 46 and 48 are disconnected from the generator circuits.

The circuit for the port motor 58 may now be traced from one terminal of the motor armature 60, junction 118, stationary contacts 114 and 113 bridged by the contact segment 98, conductor 138, armature 40 of the starboard generator 16, stationary contacts 116 and 117 bridged by contact segment 99, junction 124, conductor 128, motor armature 62 and to the other terminal of motor armature 60.

The circuit for the starboard motor 70 may be traced from one terminal of the motor armature 72, junction 130, conductor 132, armature 38 of the starboard generator 14, conductor 134, stationary contacts 110 and 109 bridged by contact segment 97, junction 136, conductor 140, motor armature 74 and to the other terminal of motor armature 72.

On the other hand, both motors may be connected in circuit relation with the port generators 10 and 12 by actuating the motor-generator selector switch 80 to the Port position. In this position, the contact segments 97, 98, and 99 no longer engage any of the stationary contacts 109 to 117, inclusive, with the result that the starboard generators 14 and 16 are disconnected from the starboard motor 70. Also the contact segments 93, 94 and 95 no longer bridge the stationary contacts 101 and 102, 104 and 105, and 106 and 107, respectively, but they do bridge stationary contacts 100 and 101, 103 and 104, and 107 and 108, respectively, with the result that the port generators 10 and 12 are no longer connected in parallel, but the port generator 10 is connected to the port motor 58 and the port generator 12 is connected to the starboard motor 70. Also, the differential field windings 22 and 24 and the cumulative field windings 26 and 28 are disconnected from the generator circuits.

The circuit for the port motor 58 may be traced from one terminal of the motor armature 60, junction 118, conductor 120, armature 18 of port generator 10, conductor 122, stationary contacts 101 and 100 bridged by contact segment 93, junction 124, conductor 128, motor armature 62 and to the other terminal of motor armature 60.

The circuit for the starboard motor 70 may be traced from one terminal of the motor armature 72, junction 130, stationary contacts 103 and 104 bridged by contact segment 94, conductor 126, armature 20 of the port generator 12, stationary contacts 107 and 108 bridged by contact segment 95, junction 136, conductor 140, motor armature 74 to the other terminal of motor armature 72.

The main field windings of the motors and generators may be energized from any suitable source (not shown) of direct current constant potential connected to a pair of conductors 142 and 144 through contacts 146 and 148, of a field relay 150, to conductors 152 and 154, respectively. An operating coil 156 on field relay 150 may be energized to close the contacts 146 and 148 and also an auxiliary set of contacts 158. The motor field windings 64, 66, 76 and 78 in series with adjustable resistors 160, 161, 162 and 163, respectively, are preferably connected in parallel across the constant potential conductors 152 and 154. To supply a variable potential to the main field windings of the generators, the potentiometers 84 and 88 are each connected across the conductors 152 and 154. The fields are then energized through the speed controllers 82 and 86 and the field selector switch 90.

Each speed controller is arranged to connect either terminal of the generator field windings selected by the field selector switch 90 to one end of a potentiometer and to connect the other terminal to any of a plurality of taps on the potentiometer. Thus by actuating either of the speed controllers, the speed of the corresponding motor may be varied from standstill to full speed in one direction or to full speed in the reverse direction. For example, the direction of rotation of one motor may be reversed while the other motor is at standstill or operating at a constant speed in either direction of rotation.

A plurality of stationary contacts of the port speed controller 82 are electrically connected to the potentiometer 84 so that a pair of stationary contacts 164 and 166 may be energized by a potential the polarity and the magnitude of which are determined by the position of the movable contact segments with respect to the stationary contacts.

Similarly, a plurality of stationary contacts of the starboard speed controller 86 are electrically connected to the potentiometer 88 so that a pair of stationary contacts 168 and 170 may be energized by a potential, the polarity and the magnitude of which are determined by the position of the movable contact segments with respect to the stationary contacts.

The field selector switch is provided to connect the filed windings in accordance with the motor generator requirements as determined by the motor-generator selector switch 80. The field selector switch 90 comprises, generally, a slidably mounted base 174 upon which are properly arranged a plurality of contact segments 175 to 180, inclusive, which segments are disposed to cooperate with a plurality of stationary contacts, or fingers, 181 to 196, inclusive.

The field selector switch 90 is directly coupled to the motor-generator selector switch 80, so that the positions of the field selector switch correspond to similar positions of the motor generator selector switch. That is, when the motor-generator selector switch 80 is actuated to the port and starboard positions, separately connecting the port motor with the port generators, and the starboard motor with the starboard generators, the field selector switch 90 is actuated to the corresponding port and starboard position, establishing circuits such that the port generator fields are controlled exclusively by the port speed controller, and starboard generator field windings are controlled exclusively by the starboard speed controller.

When the field selector switch 90 is in the port and starboard position, the main field windings 30 and 32 of the port generators 10 and 12, respectively, are connected in parallel to the port speed controller 82, and the main field windings 50 and 52 of the starboard generators 14 and 16, respectively, are connected in parallel to the starboard speed controller 86.

The circuit for field winding 30 may be traced from the stationary contact 164 of the port speed controller 82 through stationary contacts 181 and 182 bridged by the contact segment 175, conductor 198, field winding 30; conductor 200, stationary contacts 186 and 185, bridged by contact segment 177 to the stationary contact 166 of the speed controller 82.

The circuit for the field winding 32 extends from the stationary contact 164 of the port speed controller through contacts 181 and 183 bridged by the contact segment 175, conductor 202, field winding 32, conductor 204, stationary contacts 187 and 185 bridged by contact segment 177 to the stationary contact 166 of the speed controller 82.

The circuit for the field winding 50 extends from the stationary contact 168 of the starboard speed controller 86, through the stationary contacts 189 and 190 bridged by the contact segment 178, conductor 206, field winding 50, conductor 208, stationary contacts 194 and 193, bridged by the contact segment 180, and to the stationary contact 170 of the speed controller 86.

The circuit for the field winding 52 extends from the stationary contact 168 of the starboard speed controller 86, through the stationary contacts 189 and 191 bridged by contact segment 178, conductor 210, field winding 52, conductor 212, stationary contacts 195 and 193 bridged by the contact segment 180, and to the stationary contact 170 of the speed controller 86.

When less than the total or maximum number of generators are supplying electrical energy to each of the motors, there is danger of overloading one or more generators when the maximum value of the terminal voltage remains the same for all positions of the field selector switch and the motor-generator selector switch. The generators may be protected from overload by limiting their terminal voltage to a predetermined maximum value for each position of the selector switches and the speed controller, such as by adjusting the electrical characteristics of the field circuits to obtain a predetermined maximum value for each position of the selector switches and the speed controller such as by adjusting the electrical characteristics of the field circuits to obtain predetermined maximum values of excitation for the generators. For example, a plurality of resistors 214 to 217, inclusive, may be connected into the circuits of the generator field windings 30, 32, 50 and 52, respectively, when the generators are changed from parallel operation to individual operation.

When the motor-generator selector switch 80 is actuated to the starboard position, thus connecting both of the motors in circuit relation with the starboard generators as hereinbefore explained, the field selector switch is actuated to the corresponding starboard position, establishing circuits such that the field winding 52 of the starboard generator 16 is controlled by the port speed controller 82 and the field winding 50 of the starboard generator 14 is controlled by the starboard speed controller 86. At the same time, the field windings 30 and 32 of the port generators are disconnected.

When the field selector switch 90 is in the starboard position, the circuit for the field winding 52 extends from the stationary contact 164 of the port speed controller 82, through the stationary contacts 192 and 191 bridged by contact segment 179, conductor 210, field winding 52, conductor 212, stationary contacts 195 and 196, bridged by contact segment 180, resistor 217, and to the stationary contact 166 of the port speed controller 82.

The circuit for the field winding 50 now extends from the stationary contact 168 of the starboard speed 86 through the stationary contacts 189 and 190 bridged by contact segment 178, conductor 206, field winding 50, conductor 208, stationary contact 194, resistor 216, and to the stationary contact 170 of the starboard speed controller 86.

Conversely, when the motor-generator selector switch 80 is actuated to the port position, thus connecting both the motors in circuit relation with the port generators as hereinbefore explained, the field selector switch 90 is actuated to the corresponding port position, establishing circuits such that the field winding 30 of the port generator 10 is controlled by the port speed controller 82 and the field winding 32 of the port generator 12 is controlled by the starboard speed controller 86. At the same time, the field windings 50 and 52 of the starboard generators are disconnected.

When the field selector switch is in the port position, the circuit for field winding 30 extends from the stationary contact 164 of the port speed controller 82, through the stationary contacts 181 and 182 bridged by contact segment 175, conductor 198, field winding 30, conductor 200, stationary contact 186, resistor 214, and to stationary contact 166 of the port speed controller 82.

The circuit for the field winding 32 now extends from stationary contact 168 of the starboard speed controller 86 through the stationary contacts 184 and 183 bridged by the contact segment 176, conductor 202, field winding 32, conductor 204, stationary contacts 187 and 188, bridged by contact segment 177, resistor 215 and to the stationary contact 170 of the starboard speed controller 86.

Therefore, from the foregoing, it has been seen that the actuation of the motor-generator selector switch and the field selector switch as a unit, establishes such field circuit connections as are necessary to meet motor-generator circuit requirements which may be called for by a selected actuation of the motor-generator selector switch. Furthermore, it will be noted that the generator field connections are such that the port motor is always controlled by means of the port speed controller, and that the starboard motor is always controlled by means of the starboard speed controller.

It is conceivable that the field selector switch 90 and the motor-generator selector switch 80 may be designed to interrupt energized circuit conducting the usual load currents, but suitable contacts associated with the selector switches 80 or 90, the speed controllers 82 and 86 and the field relay 150 may be utilized in an auxiliary control circuit so that the selector switches 80 and 90 may be actuated only when the circuits of the motors and generators are deenergized.

A spring biased latch 218 is disposed to lock the selector switches 80 and 90 in any of the predetermined operating positions. A set of contacts 220 associated with the latch 218 and electrically connected in a holding circuit of field relay 150 are closed when the selector switches are locked in the desired operating position. The contacts 158 on the field relay are also connected in the holding circuit of the field relay. To move the selector switches 80 and 90 from one position to another, the latch 218 may be released manually, thus, also opening the contacts 220.

The port speed controller 82 is supplied with a pair of stationary contacts 222 and 224 disposed to be bridged by a movable contact segment 226 when the speed controller is in the off position, that is, when the stationary contacts 164 and 166 are deenergized as shown in Fig. 1. Similarly, the speed controller is supplied with a pair of stationary contacts 228 and 230 and a movable contact segment 232.

When both speed controllers 82 and 86 are in the Off position and the selector switches 80 and 90 are latched in the desired operating position, the coil 156 of the field relay 150 may be energized by closing a circuit interrupting device such as a switch 234. The circuit for the operating coil 156 extends from energized conductor 142, through switch 234, coil 156, stationary contacts 230 and 228 bridged by the contact segment 232, stationary contacts 222 and 224 bridged by contact segment 226, contact 220 of latch 218 to the other energized conductor 144. Once the field relay 150 is energized, its contacts remain closed as long as the switch 234 and the contacts 220 remain closed regardless of the operating position of the speed controllers because of the holding circuit which extends from the energized conductor 142 through the switch 234, coil 156, contacts 158, contacts 220 to the other energized conductor 144.

Each group of generators that are connected in parallel when the selector switch 80 is in the port and starboard position is preferably driven by a prime mover as shown in Fig. 2. However, various other arrangements may be made for driving the generators by the prime movers. For example, each generator may be driven individually by a prime mover, or as shown in Fig. 3, a generator from each parallel connected group may be driven by a prime mover. The electrical connections may remain substantially the same as in Figs. 1 and 2 except that certain of the contacts of the motor-generator selector switch may be omitted especially when the usual disconnecting switches (not shown) are utilized in the field and armature circuits of the motors and generators.

We do not wish to be restricted to the specific structural details, arrangement of parts or circuit connections herein set forth, as various other modifications thereof may be effected without departing from the spirit and scope of our invention. We desire, therefore, that only such limitations shall be imposed as are indicated in the appended claims.

We claim as our invention:

1. In a ship propulsion system, in combination, a plurality of groups of dynamo-electric machines each group comprising a plurality of generators, each having series field windings and having certain of their series windings interconnected, connected in parallel to a motor, means for disconnecting a predetermined number of the said generators, and means for connecting at least one of the remaining generators to each of the said motors.

2. In a ship propulsion system, in combination, a plurality of groups of dynamo-electric machines each group comprising a plurality of generators, each having series field windings and having certain of their series windings interconnected, connected in parallel to a motor, means for disconnecting a predetermined number of the said generators, means for connecting at least one of the remaining generators to each of the said motors, and means for controlling the speed and direction of rotation of each motor at will.

3. In a ship propulsion system, in combination, a plurality of groups of dynamo-electric machines each group comprising a plurality of generators, each having series field windings and having certain of their series windings interconnected, connected in parallel to a motor, means for disconnecting a predetermined number of the said generators, means for disconnecting certain of the series windings of all of the said generators, means for connecting at least one of the remaining generators to each of the said motors, and means for controlling the speed and direction of rotation of each motor at will.

4. In a ship propulsion system, the combination with a first prime mover, a first and a second generator mechanically coupled to the said first prime mover, a first motor for driving a first propeller, a second prime mover, a third and a fourth generator mechanically coupled to the said second prime mover, a second motor for driving a second propeller of means for selectively electrically interconnecting the said generators to the said motors, said means comprising means for connecting the said first and the said second generators in parallel with each other and to the said first motor, and for connecting the said third and the said fourth generators in parallel with each other and to the said second motor; means for connecting the said first generator to the said first motor, for connecting the said second generator to the said second motor, and for disconnecting the said third and fourth generators; and means for connecting the said third generator to the said first motor, for connecting the said fourth generator to the said second motor, and for disconnecting the said first and second generators.

5. In a ship propulsion system, the combination with a first prime mover, a first and a second separately excited generator, having a plurality of series windings, mechanically coupled to the said first prime mover, a first motor for driving a first propeller, a second prime mover, a third and a fourth separately excited generator, having a plurality of series windings, mechanically coupled to the said second prime mover, a second motor for driving a second propeller of means for selectively electrically interconnecting the said generators to the said motors, said means comprising means for connecting the said first and the said second generators in parallel with each other with certain of their series windings interconnected and to the said first motor, and for connecting the said third and the said fourth generators in parallel with each other with certain of their series windings interconnected and to the said second motor.

6. In a ship propulsion system the combination, with a first prime mover, two generators mechanically coupled to the said first prime mover, a first motor for driving a first propeller, a second prime mover, two generators mechanically coupled to the said second prime mover, a second motor for driving a second propeller of means for selectively interconnecting the said generators to the said motors, the said means comprising means for connecting two of the said generators in parallel with each other and to the said first motor, means for connecting the other two of the said generators in parallel with each other and to the said second motor; means for connecting one of the said generators driven by the said first prime mover to the said first motor, for connecting the other of the said generators driven by the first prime mover to the said second motor, and for disconnecting the said generators driven by the said second prime mover; and means for connecting one of the said generators driven by the said second prime mover to the said first motor, for connecting the other of the said generators driven by the said second prime mover to the said second motor, and for disconnecting the said generators driven by the said first prime mover.

7. In a ship propulsion system the combination with a prime mover, two separately excited generators, having a plurality of series windings, mechanically coupled to the said first prime mover, a first motor for driving a first propeller, a second prime mover, two separately excited generators, having a plurality of series windings, mechanically coupled to the said second prime mover, a second motor for driving a second propeller of means for selectively interconnecting the said generators to the said motors, the said means comprising means for connecting any two of the said generators in parallel with each other with certain of their series windings interconnected and to the said first motor, and for connecting the other two of the said generators in parallel with each other with certain of their series windings interconnected and to the said second motor; means for connecting one of the said generators driven by the said first prime mover to the said first motor, for connecting the other of the said generators driven by the first prime mover to the said second motor, and for disconnecting the said generators driven by the said second prime mover; and means for connecting one of the said generators driven by the said second prime mover to the said first motor, for connecting the other of the said generators driven by the said second prime mover to the said second motor, and for disconnecting the said generators driven by the said first prime mover.

8. In a ship propulsion system, a first and second group of dynamo-electric machines each group comprising two generators each having a plurality of series windings and a separately excited field winding, a prime mover mechanically connected to drive the two generators, a motor for driving a propeller, selecting means for selectively interconnecting the said generators and the said motors, the said selecting means comprising means for connecting the two generators of each group in parallel with certain of their series windings interconnected so that each generator of the same group is connected through certain of its own series windings and at least one series winding of the other generator of the same group.

9. In a transmission system for electrically tranmitting energy from a prime mover to a mechanical load, a first and a second group of dynamo-electric machines each group comprising two generators each having a plurality of series windings and a separately excited field winding, a prime mover mechanically connected to drive the two generators, a motor for driving a mechanical load, selecting means for selectively interconnecting the said generators and the said motors, the said selecting means comprising means for connecting the two generators of each group in parallel with certain of their series windings interconnected so that each generator of the same group is connected through certain of its own series windings and at least one series winding of the other generator of the same group, means for disconnecting the generators of either the first or the second group of dynamo-electric machines and means for connecting the generators of the other group of dynamo-electric machines so that one generator is connected to the motor of the first group of dynamo-electric machines and the other generator is connected to the motor of the second group of dynamo-electric machines.

10. In a transmission system for electrically transmitting energy from a prime mover to a mechanical load, a first and a second group of dynamo-electric machines each group comprising two generators each having a plurality of series windings and a separately excited field winding, a prime mover mechanically connected to drive the two generators, a motor for driving a mechanical load, selecting means for selectively interconnecting the said generators and the said motors, the said selecting means comprising means for connecting the two generators of each group in parallel with certain of their series windings interconnected so that each generator of the same group is connected through certain of its own series windings and at least one series winding of the other generator of the same group, means for disconnecting the generators of either the first or the second group of dynamo-electric machines and means for connecting the generators of the other group of dynamo-electric machines so that one generator with certain of its series windings disconnected is connected to the motor of the first group of dynamo-electric machines and the other generator with certain of its series windings disconnected is connected to the motor of the second group of dynamo-electric machines.

11. In an electric power system, in combination, a plurality of groups of dynamo-electric machines each group comprising a plurality of generators each having series field windings and having certain of their series windings interconnected, connected in parallel to a motor for driving a mechanical load, means for disconnecting a predetermined number of the said generators, means for connecting at least one of the remaining generators to each of the said motors, and means for controlling the speed and direction of rotation of each motor at will.

12. In a transmission system for electrically transmitting energy from a prime mover to a mechanical load, in combination, a plurality of groups of dynamo-electric machines each group comprising a plurality of generators, each having series field windings and having certain of their series windings interconnected, connected in parallel to a motor for driving a mechanical load, means for disconnecting a predetermined number of the said generators, means for disconnecting certain of the series windings of all of the said generators, means for connecting at least one of the remaining generators to each of the said motors, and means for controlling the speed and direction of rotation of each motor at will.

13. In an electric power system, the combination with a first prime mover, a first and a second generator mechanically coupled to the said first prime mover, a first motor for driving a mechanical load, a second prime mover, a third and a fourth generator mechanically coupled to the said second prime mover, a second motor for driving a mechanical load of means for selectively electrically interconnecting the said generators to the said motors, said means comprising means for connecting the said first and the second generators in parallel with each other and to the said first motor, and for connecting the said third and the said fourth generators in parallel with each other and to the said second motor; means for connecting the said first generator to the said first motor, for connecting the said second generator to the said second motor, and for disconnecting the said third and fourth generators; and means for connecting the said third generator to the said first motor, for connecting fourth generator to the said second motor, and for disconnecting the said first and second generator.

14. In an electric power system, the combination with a first prime mover, a first and a second generator mechanically coupled to the said first prime mover, a first motor for driving a mechanical load, a first device for controlling the speed and direction of rotation of the said first motor, a second prime mover, a third and a fourth generator mechanically coupled to the said second prime mover, a second motor for driving a mechanical load, a second device for controlling the speed and direction of rotation of the said second motor, of means for selectively electrically interconnecting the said generators to the said motors, said means comprising means for connecting the said first and the said second generators in parallel with each other and to the said first motor, and for connecting the said third and the said fourth generators in parallel with each other and to the said second motor; means for connecting the said first generator to the said first motor, for connecting the said second generator to the said second motor, and for disconnecting the said third and fourth generators; and means for connecting the said third generator to the said first motor, for connecting fourth generator to the said second motor, and for disconnecting the said first and second generators.

HARRY C. COLEMAN.
CLARENCE LYNN.